Patented Apr. 7, 1936

2,036,934

UNITED STATES PATENT OFFICE 2,036,934

PROCESS FOR MAKING ALGINIC ACID AND PRODUCT

Harland C. Green, San Diego, Calif., assignor to Kelco Company, Los Angeles, Calif., a corporation of Delaware No Drawing. Application April 21, 1934, Serial No. 721,829

20 Claims. (Cl. 260—108)

This invention is an improved process of producing an alginic acid from kelp, and the improved alginic acid and salts of alginic acid produced by such process. The invention is an improvement on the process disclosed in the application of Clark and Green filed October 16, 1933 Serial No. 693,891.

Alginic acid is a substance of considerable complexity and is subject to a hydrolytic breakdown which proceeds most rapidly when alginic acid is heated in water containing a strong acid, but it also takes place under many other conditions.

In Clark and Green's process the aforesaid tendency of the alginic acid to break down is decreased and the viscosity of the alginate solution increased, and the protective action of the alginate towards other colloids enhanced. I have discovered that said process can be so changed and improved as to still further lessen the tendency of the alginic acid to break down and approximately double the viscosity of the alginate solutions and correspondingly increase the protective action of the alginate.

To enable others to fully understand my improved process and products I will describe one complete process of producing insoluble fibrous alginic acid from "kelp", which term is intended to include marine plants or algae containing alginic acid compounds.

In the following specific example the actual times, temperatures, and proportions of reagents used are given; and, where necessary, the range which should be satisfactory is indicated.

(1) Leaching

Freshly harvested kelp is placed in a tank of fresh cold water or cold water which has been acidulated with hydrochloric acid or other suitable acid. The acid is added in the approximate ratio of one gallon per 300 gallons of fresh water. Enough of this mixture is used to cover all of the kelp. The kelp is left in this mixture approximately one hour, after which the mixture is drained off; the leached salts and water-soluble organic solids being removed with the drained mixture.

Fresh water is then added to the kelp in the tank and after half an hour is drained off. The leaching reduces the acid soluble salts and water-soluble organic matter in the kelp so that they will not be occluded in the subsequent precipitation step with the calcium alginate. Such occlusion makes for less efficient operation as it would require further acid treatment.

The leaching may be repeated if desired, until the salts and absorbed salt solutions in the kelp derived from the sea water are sufficiently removed. I have used leaching periods of one-half to 24 hours and find that the longer the leaching period, the greater the removal of salts. In practice this is determined by ashing samples of the kelp. The kelp as harvested has a total ash or salt content representing about 35-40% of the weight of the solids. The leaching is continued until that ash or salt content is reduced to about 5 to 15% of the weight of the solids.

(2) Digesting

After leaching, the kelp is chopped into convenient lengths to feed to a mill (preferably a Williams hammer mill) equipped with a ⅛ inch mesh screen. As the kelp is milled, a soda ash (or other alkaline) solution is added. The method for mixing the milled kelp and the alkaline solution would be controlled by the equipment available. For instance I have first placed the alkaline solution in a tank and milled the leached kelp into the tank with satisfactory results. Any adequate means of thoroughly mixing the alkaline solution and the milled leached kelp provides very good results. I preferably use from 40 to 50 pounds of soda ash per ton of freshly harvested kelp in order to obtain a pH over 9.6 prior to filtering. As the kelp ages after harvesting if it is not immediately processed more soda ash is required to give the desired pH.

I have found it very important that the pH value of the sodium alginate liquors resulting from the mixing of sodium carbonate solution and milled leached kelp be controlled within certain limits as previously mentioned. Fresh kelp contains a relatively large percentage of sugars of different types. Normally a quantity of kelp sufficient to operate a plant approximately 24 hours is harvested. During the latter part of this period these sugars are subject to decomposition which cause a change, upon storage, of the pH value of the kelp. In order therefore to keep the pH value of the sodium alginate liquors constant throughout the 24 hour period while using kelp of varying pH values, it is necessary to slightly increase the amount of soda ash used to produce batches of sodium alginate liquor having the same pH value. I have found that a pH of approximately 10.0 gives optimum filtering and precipitating results.

The resultant crude sodium alginate solution is added to sufficient permutited or tap water (of about 50° F.) to enable it to be pumped and agitated; usually about one hundred gallons of water per ton of raw kelp is used. Digestion starts as soon as the kelp and soda ash are mixed and requires about one-half hour; but the mixture has been left for as much as 24 hours without loss of viscosity due to the low temperature employed, (approximately 50° F.) In the Clark-Green process the temperature in the digesting step is about 180° F. and slight variations in the time of primary digestion markedly alters the viscosity and yield of the finished product.

It should be understood that soda ash (sodium carbonate) is used above simply as illustrative, as alkalies other than sodium carbonate may be employed in the digestion step above described within the scope of the invention.

The sodium alginate solution is then milled a second time (preferably in the Williams mill) through a 30 mesh screen. This second milling insures complete digestion but is not vital to the operation. This milling is accomplished by pumping the kelp to a tank and allowing it to flow into and through the mill. I have determined that the reaction continues from the time the milled leached kelp first comes in contact with the sodium carbonate solution until the time when that solution has been diluted, filtered and precipitated. In other words, I consider the total digesting time to be the period from when the sodium carbonate solution and kelp are mixed together, up to the time when the alginate is precipitated by calcium chloride as calcium alginate. Variations in yield and in breakdown of the algin molecules can be very closely predetermined by varying the time and temperature of the material during this period.

(3) *Separation of fibrous calcium alginate*

The sodium alginate solution is then diluted with cold permutited water in approximately a 1:6 ratio and agitated thoroughly to insure good dispersion. This dilution is done merely to aid filtration. Permutited water is used to prevent the formation of insoluble calcium alginate found in using tap water; such formation is undesirable as it causes inefficient filtration and loss of yield. The temperature during this stage is kept at about 50° F.; whereas at this stage in the Clark-Green process a temperature of about 120° F. is maintained. The pH is about 9.6 to 11, slightly higher than in the Clark-Green process.

To make my cold process method successful it is necessary to prevent bacterial decomposition. Bacteria enter with the kelp, the air, or reagents used; and if allowed to react for sufficient time they cause a break down of the sugars and algin present. The bacterial growth can be measured by observation of the pH of the diluted liquor and also by the odor of the liquor. Such growth materially destroys the viscosity, efficiency and yield of the alginate. I have found I can control the bacteria by (1) using clean tanks which are disinfected when necessary by chlorine or other suitable means, (2) keeping the temperature low and, (3) further processing the material immediately, if bacterial decomposition sets in, to prevent further decomposition. The diluted liquor is preferably filtered, immediately after dilution, in order to prevent this bacterial growth; but I have successfully made alginic acid even after the liquor has stood several hours.

To filter, the unfiltered liquor is pumped into a tank and filter-aid, such as diatomaceous silica, added thereto: the mixture is then pumped through a mechanical filter press. The use of such filter-aid gives a more brilliant and purer alginate than obtained by any other separation means, as all of the cellulose and other insoluble constituents are removed. The temperature during this filtering step is approximately 50° F. whereas during the corresponding step in the Clark-Green process the temperature is about 120° F.

In this particular filtering step steam might be applied to the tank wherein the filter-aid is added to slightly raise the temperature of the liquor previous to passing it through the filter press, as this will reduce the viscosity of the material so that filtration can be accomplished more quickly and cheaper. Such temperature increase, approximately from 50 to 120° F., is only temporary, and only done with dilute liquor and the filtered liquor is cooled after leaving the press; or the precipitated calcium alginate (see next step) is cooled by washing with cold water.

While I prefer to separate the insoluble matter from the sodium alginate liquor by using filter aid and a mechanical filter press, other methods could be used, such as centrifuging, vacuum filtering, sand bed filtration and straight gravity settling of the cellulose when the liquor is very dilute.

For some purposes the presence of cellulose in sodium and ammonium alginates is not objectionable. The same improvement in the quality of the alginic acid as compared to former types of alginic acid is obtained whether or not the cellulose is removed from the liquor. It is my intention to manufacture sodium alginate by my process including the filtration for the removal of insoluble matter for the food industry, and to also manufacture other grades of sodium alginate and ammonium alginate by my process without removing the cellulose for other industries where the use will be industrial applications. In other words the increased value or improvement obtained by this new process and the outstanding differences in the properties of the products manufactured by my process as compared to other processes is not in any way dependent upon whether the cellulose is removed from the liquor or not. This optional step is only dependent upon the application for which the product is being prepared.

(4) *Production of insoluble fibrous calcium alginate*

After filtration the liquor is added slowly to an agitated solution of preferably calcium chloride in about the proportions of about 100 lbs. of calcium chloride and 800 lbs. of water per 8 tons of the liquor. This results in the formation of an insoluble salt of alginic acid. The stated proportions will vary directly with variations in the sodium alginate concentration of the liquor to be precipitated. Other salts which precipitate alginate may, of course, be used instead of calcium chloride.

After the precipitating tank is full, agitation is stopped and the precipitate permitted to rise to the top. The remaining liquor (containing unleached salts, soluble organic matter, excess soda ash and calcium chloride and some calcium carbonate), is then drained off. Water is then added to the precipitate and enough chloride of lime, or other suitable bleaching agent added to remove the kelp flavor, and impart the desired whiteness to the material.

The amount of bleach used is dependent upon the color of precipitate before bleaching. This color in turn is dependent upon the color of the sodium alginate liquor used for precipitating. I have found that the larger the concentration of sodium carbonate used for the digestion and/or the longer the period of digestion and/or the higher the temperature of digestion, the darker the color of sodium alginate liquor resulting from the reaction. The controlling factor on the color after bleaching the calcium alginate is the color of the solution which is made from the finished salt, such as sodium or ammonium alginate. I have found that this solution color varies directly with the color of the calcium alginate before acid treating.

One of the outstanding advantages of my process is that since the sodium alginate liquor to be precipitated is made at low temperature the calcium alginate precipitated from the liquor is of much lighter color than the calcium alginate made from liquors produced under former processes. This means therefore that a considerably smaller amount of bleach is required to lighten the color of calcium alginate produced by this process to a given color standard than is required with former processes. An average amount of bleach to be used in this process to lighten the color of the calcium alginate sufficiently to produce a finished salt that will give a very light solution color is about 20 pounds of bleach in one ton of water.

I have found that one of the serious factors causing breakdown of the molecular sizes of the alginic acid recovered is the amount of bleach used. The difference therefore in the natural color of the calcium alginate precipitated by my cold process as compared to previous processes contributes to a large extent to the improvement in the resultant alginic acid obtained because of the fact that less bleach is required.

(5) Conversion into fibrous alginic acid

Following bleaching, the precipitate is separated from the surplus water. The precipitate is then introduced into a dilute hydrochloric acid solution in the proportion of approximately 100 pounds of the precipitate, anhydrous basis, to 200 pounds of hydrochloric acid in 4000 pounds of water whereby the fibrous calcium alginate is converted into fibrous alginic acid.

The admixture is then passed through a suitable screen to remove the excess acid solution and the calcium chloride formed by the reaction of the hydrochloric acid and calcium alginate. The drained precipitate is then added to a second tank of water containing dilute hydrochloric acid, agitated for a short time and then pumped over another screen. This treatment is repeated until the precipitate is washed free of calcium salts. Enough fresh or permutited water is used in the washing to render the pH of the acid over 1.9 and at the same time reduce the amount of the ash or calcium contained in the fiber.

The pure alginic acid may then be concentrated either by means of a press or filter. It is then immediately stored in a refrigerated room.

In my new process the use of heat in the extraction of the algin is practically eliminated and the resulting alginate is so much more free from breakdown that only about 40% to 50% as much is required in commercial uses as heretofore required with the conventional type of alginate that has been produced heretofore. My process requires no additional heat as heretofore required in the extraction of algin from kelp, and while the optional use of heat as an aid in the filtration step is mentioned above, so little heat would ever be used for that purpose and even then for so short a time, that it can be considered to have substantially no effect on the reaction at that point. The optional use of heat at that point is merely a detail of filtering. By the Woolwich method of determining viscosities my new improved products have a viscosity ranging from 400 to 2000 seconds on a 1% solution, as compared to the old conventional type of alginates that have a viscosity of 5 to 10 seconds on a 2% solution. Briefly the Woolwich viscosity method consists in putting the solution under test in a long vertical test tube about one centimeter in diameter and determining the length of time in seconds for a steel ball one sixteenth inch in diameter to fall fifteen centimeters through the solution. This time is called the Woolwich viscosity value.

I have found that the acid treating and washing process is most effective with a pH of approximately 1.3 in the first treatment, 1.5 in the next, and 1.8 in the remaining. The temperature is kept as cool as practicable as I have found high temperatures not only cause a decrease in the viscosity of the finished product but also a loss in yield.

I have found that a temperature over 120° F. has caused decomposition and loss of the entire precipitate. In the foregoing process I operate at approximately 50° F., but intend to further reduce this temperature to a few degrees above the freezing point.

In the Clark-Green process steam or other heat is used; whereas I avoid heat and employ mechanical means to break up and mix cold kelp with a cold alkali to cause digestion, and thereby maintain colder temperatures throughout the process.

My cold process reduces the rate of hydrolytic break down attending the Clark-Green process and is less sensitive in regard to length of time during digestion and dilution prior to filtration. It also enables me to consistently produce a more uniform and higher viscosity alginic acid than heretofore obtained. Thus a steel ball 1/16 of an inch in diameter will fall 15 centimeters in approximately 800 seconds when dropped in a 2% solution of ammonia alginate made by the Clark-Green process; whereas the ball will be suspended over 800 seconds in a 1% solution of my improved alginate.

Also whereas .18% of Walsh-Thornley's product (Patent No. 1,814,981) or .10% of the product of the Clark-Green process is required to give a certain suspension of cocoa in chocolate milk; only .08% of the product of my improved process is required. And, in general, the aqueous solutions of salts of alginic acid produced by my improved process possess higher viscosities and have greater efficiency in producing dispersions of insoluble solids and liquids than alginates heretofore obtained in the extraction of alginic acid from kelp by prior processes.

My new product can be used in all the present uses of alginates and does the same work more efficiently. Some special uses are: (1) creaming latex, (2) suspending and emulsifying auto polish, and (3) as a stabilizer in ice creams, ice milk, sherbets and ices.

Algin produced by my process has shown a viscosity as determined by the Woolwich method, by using a 1% solution instead of a 2% solution, of over 800 seconds. It is impractical to attempt to measure the viscosity of a 2% solution by this method. The viscosity of a one-half of 1% solution ranges from 20 to 30 seconds.

An essential difference between my process to obtain this material and the Clark and Green process is that heat is not used as required in their process. Instead of cooking the kelp in a solution of sodium carbonate I mill the leached kelp into a cold solution of sodium carbonate where it is agitated for a few minutes, when the resulting crude solution of sodium alginate is again milled through a very fine screen. In addition to this I have further reduced the time of leaching in cold water, the first leach water containing a small amount of hydrochloric acid, and have also reduced the time of acid treating the calcium alginate with hydrochloric acid.

Another difference is that the solution color of ammonium or sodium alginate made without any bleach is much lighter when made by my process than by former processes. Furthermore, a still lighter color may be obtained by adding a much smaller amount of bleach to the calcium alginate made by my process than made by former processes. This results in less breakdown of the size of the algin molecule by the bleach than in former processes.

My process also makes possible higher recoveries than any hot process. During the digestion of the kelp plant which is going on from the time the sodium carbonate is added to the milled leached kelp up to the time the liquor has been precipitated into calcium alginate the material is kept cool throughout. This is in sharp contrast with former processes. As commonly known the speed of a chemical reaction varies with temperature, and close control of my process is much less critical than of the hot processes. This is borne out by the fact that by my process much larger molecules are obtained in the finished alginic acid. The hot digestion used in former processes results not only in reducing the size of the molecules of the recovered alginate but the amount of alginic acid recovered from a given amount of kelp is greatly reduced. Much higher recoveries of alginic acid from given quantities of kelp are possible under practical operating conditions with my cold process than with hot processes because the reaction going on between the sodium carbonate and the algin in the kelp is much less critical to control and because the operator can quite easily decide when to precipitate the sodium alginate liquor to obtain the largest yield of calcium alginate. The yield of calcium alginate obtained from the sodium alginate liquor is much more a question of chance when using a hot process than when using my cold process.

Comparative tests of my product have shown that for some purposes it is approximately four times more efficient than the old conventional alginates and about twice as efficient as the alginates produced by the Clark and Green process.

I claim:—

1. The herein described cold process of preparing alginic acid, consisting in cold leaching kelp, digesting the leached kelp in an alkaline solution without addition of heat, comminuting the digested pulp, diluting the comminuted pulp with cold water and filtering the mixture, mixing the filtrate with a cold solution of a salt that will precipitate an insoluble salt of alginic acid from a sodium alginate solution, separating the resultant insoluble precipitated alginate, subjecting the alginate to a cold solution of an acid capable of forming a soluble salt with the mineral constituent of the insoluble alginate, and finally separating the free alginic acid and washing it with cold water.

2. The herein described cold process of preparing alginic acid, consisting in cold leaching fresh kelp, digesting the leached kelp in an alkaline solution to which no heat is added, and comminuting the digested pulp, diluting the comminuted pulp with cold water and filtering the mixture, mixing the filtrate with a cold calcium chloride solution to precipitate calcium alginate, separating the resultant calcium alginate, subjecting the alginate to a cold solution of an acid capable of forming a soluble salt with the mineral constituent of the insoluble alginate, and finally separating the free alginic acid and washing it with cold water.

3. The herein described cold process of preparing fibrous alginic acid, consisting in leaching fresh kelp in a cold solution of a soluble acid which at the concentration prevailing in the diluted liquor does not form a precipitate with the subsequently added calcium chloride solution, digesting the leached kelp in a cool solution containing sodium carbonate and comminuting the digested pulp, diluting the comminuted pulp with cold water and filtering the mixture, mixing the filtrate with a calcium chloride solution, separating the resulting fibrous calcium alginate, subjecting the alginate to a cold solution of hydrochloric acid, and finally separating the free fibrous alginic acid and washing it with cold water.

4. The herein described cold process of preparing fibrous alginic acid, consisting in leaching fresh kelp in a cold solution of a soluble acid which at the concentration prevailing in the diluted liquor does not form a precipitate with the subsequently added calcium chloride solution, digesting the leached kelp in a cold solution containing sodium carbonate, comminuting the digested pulp, diluting the comminuted pulp with cold water and filtering the mixture, mixing the filtrate with a calcium chloride solution, separating the liquor from the resultant fibrous calcium alginate, bleaching the fibrous alginate and washing it with cold water, subjecting the bleached alginate to a cold solution of hydrochloric acid, separating said alginate from the solution and washing it with cold water.

5. The process of producing alginic acid, consisting in leaching freshly harvested kelp in a cold solution of dilute hydrochloric acid to remove the salts and absorbed salt solutions, milling the kelp and digesting the same in a cold solution of soda ash, milling the resultant paste and diluting it with cold water and filtering, mixing the filtrate with a cold solution of calcium chloride to produce fibrous calcium alginate, separating the precipitated alginate and treating same with a cold solution of hydrochloric acid, and finally separating the insoluble alginic acid from the solution and washing same.

6. The herein described process of producing alginic acid consisting in leaching freshly harvested kelp in a cold solution of dilute hydrochloric acid to remove the salts and absorbed salt solutions, milling the kelp and digesting the same in a cold solution of soda ash, milling the resultant paste and diluting it with cold water and filtering, mixing the filtrate with a cold solution of calcium chloride to produce fibrous calcium alginate, bleaching the fibrous calcium alginate, separating the precipitated alginate and treating same with a cold solution of hydrochloric acid, and finally separating the insoluble alginic acid from the solution, and washing same.

7. The herein described alginic acid whose sodium salt in aqueous solution will produce dispersions of insoluble liquids and solids, and whose ammonium salt at a concentration of 1% in an aqueous solution has a viscosity, as determined by the Woolwich method, of over 800 seconds.

8. The herein described fibrous alginic acid produced by cold leaching kelp, digesting the leached kelp in a cool alkaline solution, comminuting the digested kelp and diluting it with cold water and filtering same, precipitating an insoluble alginate in the filtrate by adding a cold solution of a salt whose metallic radical ion forms an insoluble precipitate with alginate ion, separating the insoluble precipitated alginate, subjecting it to a cold solution of an acid capable of forming a soluble salt with the mineral constituent of the insoluble alginate, and finally separating and washing the free alginic acid.

9. The herein fibrous alginic acid produced by leaching fresh kelp in a cold solution of a soluble acid which at the concentration prevailing in the diluted liquor does not form a precipitate with the subsequently added calcium chloride solution, digesting the leached kelp in a cool solution containing sodium carbonate, comminuting the digested pulp, diluting it with cold water and filtering it, mixing the filtrate with a calcium chloride solution, separating the resultant fibrous calcium alginate and subjecting it to a cold solution of hydrochloric acid, and finally separating the free fibrous alginic acid and washing it.

10. The herein described fibrous alginic acid, of which an aqueous one percent ammonia alginate solution will have a viscosity as determined by the Woolwich method of over 800 seconds.

11. The herein described cold process of preparing fibrous alginic acid, consisting in leaching fresh kelp in a cold solution of a soluble acid which at the concentration prevailing in the diluted liquor does not form a precipitate with the subsequently added calcium chloride solution, digesting the leached kelp to a pulp in a cold solution containing sodium carbonate, comminuting the digested pulp, diluting the comminuted pulp with cold water, filtering the mixture, mixing the filtrate with a calcium chloride solution to precipitate fibrous calcium alginate, separating the resultant fibrous calcium alginate, subjecting such fibrous alginate to a cold solution of hydrochloric acid, and finally separating the free fibrous alginic acid and washing it with cold water.

12. The herein described cold process of preparing fibrous alginic acid, consisting in leaching fresh kelp in a cold solution of a soluble acid which at the concentration prevailing in the diluted liquor does not form a precipitate with the subsequently added calcium chloride solution, digesting the leached kelp to a pulp in a cold solution containing sodium carbonate, comminuting the pulp, diluting the comminuted pulp with cold water, filtering the mixture, mixing the filtrate with a calcium chloride solution to precipitate fibrous calcium alginate, separating the liquor from the resultant fibrous calcium alginate, bleaching the fibrous alginate, washing it with cold water, subjecting the bleached and washed alginate to a cold solution of hydrochloric acid, separating said alginate from the solution, and washing it with cold water.

13. The herein described fibrous alginic acid produced by cold leaching kelp, digesting the leached kelp to a pulp in a cool alkaline solution, comminuting the digested pulp, diluting it with cold water and filtering same, precipitating the alginate ion in the solution by a cold solution of a salt whose metallic radical ion forms an insoluble precipitate with alginate ion, separating the insoluble precipitated alginate, subjecting such alginate to a cold solution of hydrochloric acid, separating the insoluble alginic acid and washing it.

14. The herein described fibrous alginic acid produced by leaching fresh kelp in a cold dilute solution of an inorganic acid, digesting the leached kelp in a cold solution containing sodium carbonate, comminuting the digested pulp, diluting it with cold water and filtering it, mixing the filtrate with a calcium chloride solution to precipitate calcium alginate, separating the resultant fibrous calcium alginate from the solution and subjecting such alginate to a cold solution of hydrochloric acid, finally separating the free fibrous alginic acid, and washing it.

15. The herein described cold process of preparing alginic acid consisting in cold leaching kelp, digesting the leached kelp in an alkaline solution without addition of heat, comminuting the digested pulp, mixing the comminuted pulp with a cold solution of a salt that will precipitate an insoluble salt of alginic acid from a sodium alginate solution, separating the resultant insoluble precipitated alginate, subjecting the alginate to a cold solution of an acid capable of forming a soluble salt with the mineral constituent of the insoluble alginate and finally separating the free alginic acid and washing it with cold water.

16. The herein described process of producing alginic acid consisting in leaching freshly harvested kelp in a cold solution of dilute hydrochloric acid to remove the salts and absorbed salt solutions, milling the kelp and digesting the same in a cold solution of soda ash, milling the resultant paste, mixing the milled paste with a cold solution of calcium chloride to produce fibrous calcium alginate, bleaching the fibrous calcium alginate, separating the precipitated alginate and treating same with a cold solution of hydrochloric acid, and finally separating the insoluble alginic acid from the solution, and washing same.

17. The herein described fibrous alginic acid produced by cold leaching kelp, digesting the leached kelp in a cool alkaline solution, comminuting the digested kelp, precipitating an insoluble salt of alginic acid from the comminuted kelp by a cold salt solution whose metallic ion form an insoluble precipitate with an alginate ion, separating the insoluble precipitated alginate, subjecting it to a cold solution of an acid capable of forming a soluble salt with the mineral constituent of the insoluble alginate, and finally separating the free alginic acid and washing it.

18. The herein described cold process of preparing fibrous alginic acid, consisting in leaching fresh kelp in a cold solution of a soluble acid which at the concentration prevailing in the diluted liquor does not form a precipitate with the subsequently added calcium chloride solution, digesting the leached kelp to a pulp in a cold solution containing sodium carbonate, comminuting the digested pulp, mixing the digested pulp with a calcium chloride solution to precipitate fibrous calcium alginate, separating the resultant fibrous calcium alginate, subjecting such fibrous alginate to a cold solution of hydrochloric acid, and finally separating the free fibrous alginic acid and washing it with cold water.

19. The herein described fibrous alginic acid produced by cold leaching kelp, digesting the leached kelp to a pulp in a cool alkaline solution, comminuting the digested pulp, precipitating the alginate ion in the pulp by a cold solution of a salt whose metallic ion forms an insoluble precipitate with an alginate ion, separating the insoluble precipitated alginate, subjecting it to a cold acid solution capable of forming a soluble salt with the mineral constituent of the insoluble alginate, and finally separating the insoluble alginic acid and washing it.

20. The herein described fibrous alginic acid produced by cold leaching kelp, digesting the leached kelp to a pulp in a cool alkaline solution, comminuting the digested pulp, precipitating the alginate ion in the pulp as an insoluble alginate by a cold solution of a salt whose metallic radical ion forms an insoluble precipitate with alginate ion, separating the insoluble precipitated alginate, subjecting such alginate to a cold solution of hydrochloric acid, and separating and washing the insoluble alginic acid.

HARLAND C. GREEN.